(12) United States Patent
Williamson et al.

(10) Patent No.: US 11,112,331 B1
(45) Date of Patent: Sep. 7, 2021

(54) DISTRIBUTED SENSING SYSTEM FOR NETWORK CABLE SYSTEMS

(71) Applicant: Marmon Utility LLC, Milford, NH (US)

(72) Inventors: Rick Williamson, Bass River (CA); Michael P. Norton, Merrimack, NH (US); Sergio Arellano, Collierville, TN (US)

(73) Assignee: Marmon Utility LLC, Milford, NH (US)

( * ) Notice: Subject to any disclaimer, the term of this patent is extended or adjusted under 35 U.S.C. 154(b) by 0 days.

(21) Appl. No.: 17/194,189

(22) Filed: Mar. 5, 2021

Related U.S. Application Data

(60) Provisional application No. 62/986,187, filed on Mar. 6, 2020.

(51) Int. Cl.
| | |
|---|---|
| *G01V 8/24* | (2006.01) |
| *G01M 5/00* | (2006.01) |
| *G01H 9/00* | (2006.01) |
| *G01K 1/02* | (2021.01) |

(52) U.S. Cl.
CPC .......... *G01M 5/0025* (2013.01); *G01K 1/026* (2013.01); *G01M 5/0041* (2013.01); *G01M 5/0066* (2013.01); *G01V 8/24* (2013.01); *G01H 9/00* (2013.01)

(58) Field of Classification Search
CPC ............. G01M 5/0025; G01M 11/085; G01M 11/086; G01M 3/38; G01B 11/16; G01N 29/2418; G01N 29/00; G01H 9/004; G01H 9/006; F16B 2/06; G01V 1/226; G01V 1/40
See application file for complete search history.

(56) References Cited

U.S. PATENT DOCUMENTS

| | | | |
|---|---|---|---|
| 9,494,461 B2 * | 11/2016 | Hornman ................. | G01V 1/40 |
| 10,215,016 B2 * | 2/2019 | Xia .......................... | G01V 1/46 |
| 2011/0292384 A1 * | 12/2011 | Ramos ................ | G01M 5/0025 |
| | | | 356/301 |

* cited by examiner

*Primary Examiner* — Brandi N Hopkins
(74) *Attorney, Agent, or Firm* — Arnold & Porter Kaye Scholer

(57) ABSTRACT

A monitoring system is disclosed herein that is configured to utilize a distributed sensing system to monitor both a cable and cable accessories included within a cable circuit. In various embodiments, the monitoring system may include a distributed sensing system and one or more cable accessory wrap assemblies. The distributed sensing system may include a distributed sensing fiber following (or integrated into) the cable and connected to a cable accessory wrap assembly for each of the one or more cable accessories in-line with cable. In various embodiments, each cable accessory wrap assembly may comprise a cable wrap embedded with a distributed sensing fiber. The distributing sensing fiber of a cable accessory wrap assembly may be configured to provide measurements to distributed sensing system indicating that an anomaly event occurred at a given cable accessory.

20 Claims, 6 Drawing Sheets

DISTRIBUTED SENSING SYSTEM FOR NETWORK CABLE SYSTEMS

RELATED APPLICATIONS

This application claims priority to U.S. Provisional Patent Application No. 62/986,187, filed Mar. 6, 2020, the content of which is incorporated herein by reference in its entirety.

FIELD OF THE INVENTION

The present invention relates to cable systems, more particularly, to cable systems using distributing sensing along the length of a cable and across accessories included within the cable system.

BACKGROUND OF THE INVENTION

Currently, distributed sensing systems are used to monitor point-to-point transmission circuits. Distributed sensing is a technology that enables continuous, real-time measurements along the length of a cable. As used herein, distributed sensing may refer to distributed temperature sensing (DTS), distributed strain sensing (DSS), and/or distributed acoustic sensing (DAS). When distributed sensing begins to be deployed down-market into distribution systems, the cable circuits often have many more splices, joints, connectors, or other cable accessories. The majority of power cable network failures are associated with splices, joints, connectors, or other cable accessories and are driven in large part by poor workmanship. While distributed sensing systems are designed to monitor a cable or other distributed object, these systems are challenged to monitor non-distributed elements connecting distributed objects.

Indeed, conventional distributed sensing systems do not monitor the less-reliable cable accessories included within a cable circuit. While distributed sensing could be used to monitor a system by wrapping the distributed sensing fiber around cable accessories, this would be time intensive and inconsistent in performance and reliability. For example, the spatial resolution of conventional distributed sensing systems would make it difficult to accurately identify a anomaly event at a given cable accessory. As such, a monitoring system capable of using a distributed sensing system to efficiently monitor both the cable and the accessories included within the cable circuit would represent a great improvement.

SUMMARY OF THE INVENTION

Aspects of this disclosure relate to a monitoring system configured to utilize a distributed sensing system to monitor both a cable and cable accessories included within a cable circuit. As such, the monitoring system described herein is capable of monitoring the entire cable circuit, including cable accessories within the cable circuit. As used herein, "cable accessories" may include splices, elbow or other joints, connectors, and/or other components or network elements included within a cable circuit. In various embodiments, the monitoring system may include a distributed sensing system and one or more cable accessory wrap assemblies. The distributed sensing system may include a distributed sensing fiber following (or integrated into) the cable and connected to a cable accessory wrap assembly for each of the one or more cable accessories in-line with cable. In various embodiments, each cable accessory wrap assembly may comprise a cable wrap embedded with a distributed sensing fiber. The distributing sensing fiber of a cable accessory wrap assembly may be configured to provide measurements to distributed sensing system indicating that an anomaly event occurred at a given cable accessory.

These and other objects, features, and characteristics of the invention disclosed herein will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention is illustrated by way of example and not limited in the accompanying figures in which like reference numerals indicate similar elements and in which.

These drawings are provided for purposes of illustration only and merely depict typical or example embodiments. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF THE INVENTION

In the following description of various examples of the invention, reference is made to the accompanying drawings, which form a part hereof, and in which are shown by way of illustration various example parts, structures, systems, and steps in which aspects of the invention may be practiced. It is to be understood that other specific arrangements of example parts, structures, systems, and steps may be utilized, and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

This invention relates to a monitoring system and components thereof configured to utilize distributed sensing to monitor both a cable and cable accessories included within a cable circuit. Accordingly, the monitoring system described herein is capable of monitoring the entire cable circuit, including cable accessories within the cable circuit. As used herein, "cable accessories" may include splices, elbow or other joints, connectors, and/or other components or network elements included within a cable circuit.

Figure 1:
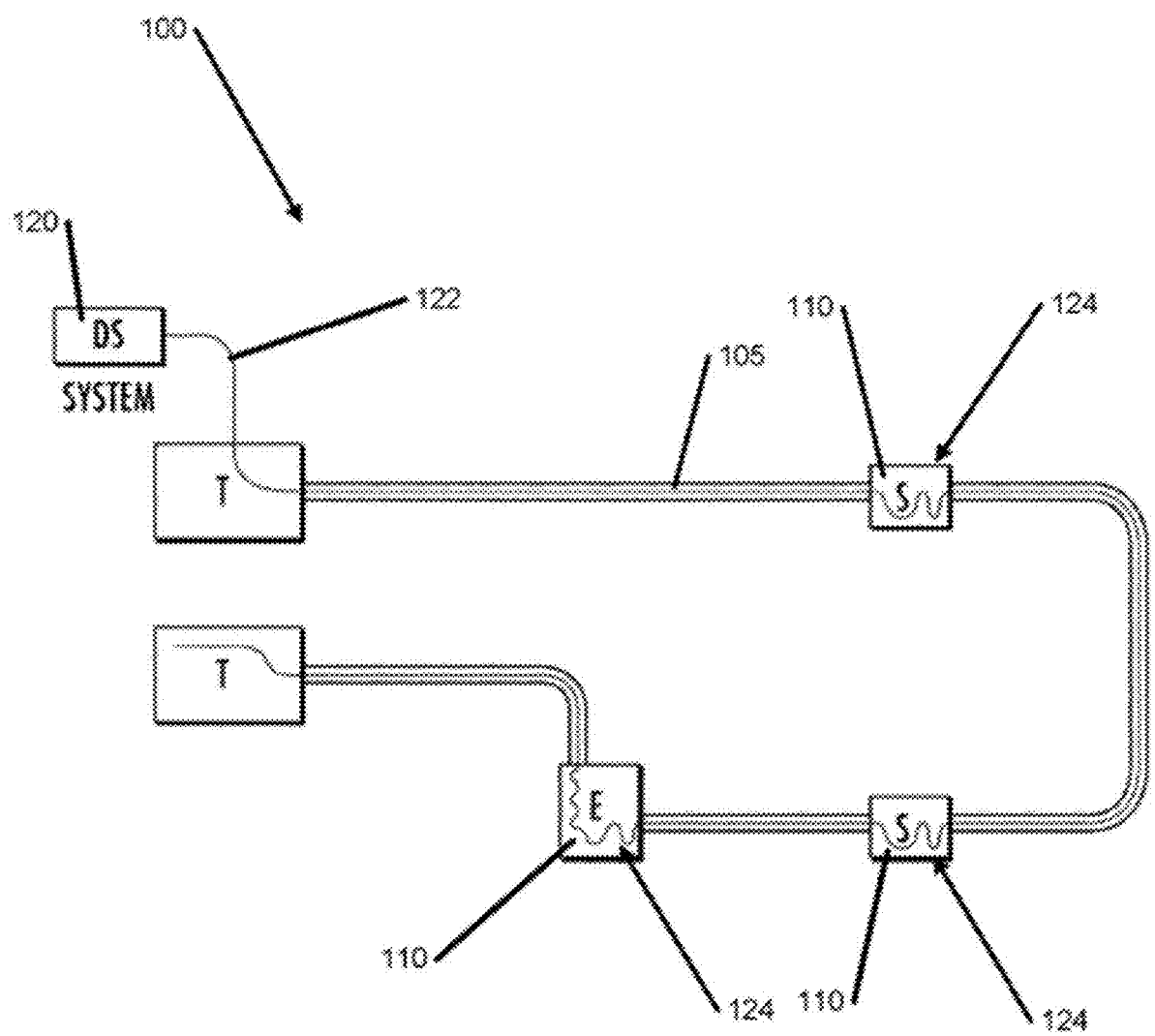
FIG. 1 depicts a schematic view of a monitoring system configured to monitor all network elements affixed to a cable using a distributed sensing system, in accordance with one or more aspects described herein.

FIG. 1 depicts a schematic view of a monitoring system 100 configured to monitor all network elements affixed to a cable 105 using distributed sensing system 120, in accordance with one or more aspects described herein. For example, monitoring system 100 may be configured to monitor cable accessories 110 in-line with cable 105 using distributed sensing. In various embodiments, distributed sensing system 120 may include a distributed sensing fiber 122 following (or integrated into) cable 105. In various embodiments, distributed sensing system 120 may be configured to receive measurements from one or more distributed sensing fibers (e.g., fiber 122) and identify where within a cable circuit an anomaly event occurred based on the received measurements. For example, distributed sensing system 120 may be configured to receive measurements and identify where within a cable circuit a temperature, strain, and/or acoustic event anomaly occurred based on the received measurements. In various embodiments, monitoring system 100 may include a distributed sensing system 120, one or more cable accessory wrap assemblies 124, and/or one or more other components. In various embodiments, fiber 122 may be connected to a cable accessory wrap assembly 124 for each of the one or more cable accessories 110 in-line with cable 105. To enable the use of distributed sensing to monitor the cable accessories 110 connected within the cable circuit of cable 105, the following concepts are incorporated into this invention, as shown in the figures.

Figure 2A:
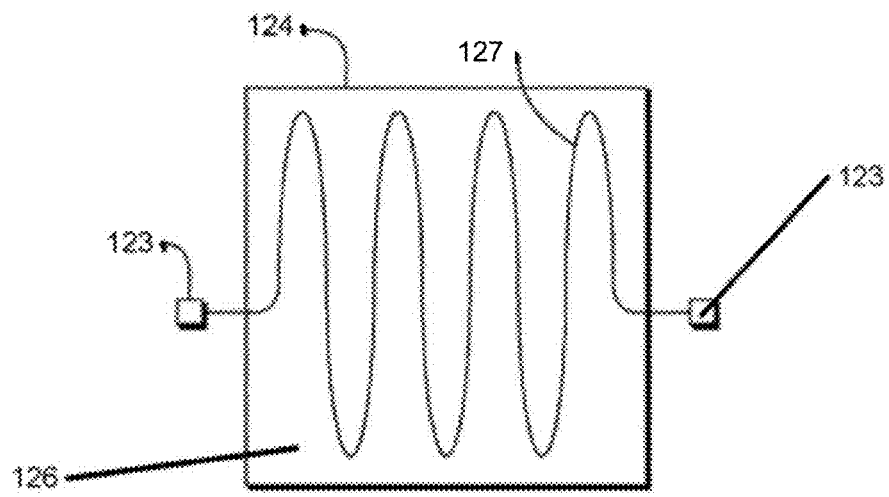
FIG. 2A depicts a cable accessory wrap assembly configured to be affixed to a cable with a cable splice, in accordance with one or more aspects described herein.

FIGS. 2A-6B depict various methods or techniques that enable monitoring system 100 to monitor both cable 105 and cable accessories 110 included within the cable circuit. For example, FIG. 2A and FIG. 2B depict a cable accessory wrap assembly 124 configured to be affixed to a cable with a cable splice, in accordance with one or more aspects described herein. In various embodiments, cable accessory wrap assembly 124 may include a wrap 126 and a distributed sensing fiber or fibers 127. For example, cable accessory wrap assembly 124 may comprise a cable wrap 126 embedded with distributed sensing fiber 127. In various embodiments, fiber 127 may be configured to provide measurements to distributed sensing system 120 indicating that an anomaly event occurred at cable accessory 110. For example, measurements provided to distributed sensing system 120 by fiber 127 may enable distributed sensing system 120 to determine that a temperature, strain, or acoustic event anomaly occurred at cable accessory 110. As used herein, distributed sensing may refer to distributed temperature sensing (DTS), distributed strain sensing (DSS), and/or distributed acoustic sensing (DAS). Accordingly, fiber 127 may comprise a DTS, DSS, and/or DAS fiber.

The resolution of distributed sensing system 120 may depend on the length of the circuit being monitored. To ensure the length of fiber incorporated in distributed sensing system 120 (i.e., fiber 122 and/or fiber(s) 127 of one or more cable accessory wrap assemblies 124) is sufficient to enable the distributed sensing system 120 to resolve the cable accessory 110 as a data point, the length of fiber 127 embedded in wrap 126 may be increased by adjusting the arrangement or orientation of fiber 127 within cable accessory wrap assembly 124. For example, fiber 127 may weave back and forth within wrap 126 (and/or with one or more other orientations) in order to ensure enough fiber covers cable accessory 110 such that distributed sensing system 120 can resolve a temperature, strain, or acoustic event anomaly at these cable accessories 110.

In some embodiments, fiber(s) 127 may be the same as or similar to fiber 122. For example, when connected to fiber 122 of distributed sensing system 120 (i.e., the fiber following or integrated into cable 105), fiber 127 of a cable accessory wrap assembly 124 affixed at a cable accessory 110 to cable 105 may be integrated with fiber 122 and enable distributed sensing system 120 to monitor both cable 105 and cable accessory 110. In some embodiments, cable accessory wrap assembly 124 may include one or more connectors 123 to connect fiber 127 of cable accessory wrap assembly 124 to fiber 122 of distributed sensing system 120. In some embodiments, fiber 127 may be connected to other connectors and/or may itself be spliced. For example, fiber 127 of cable accessory wrap assembly 124 may be connected to fiber 122 via a fiber splice. In some embodiments, fiber 127 may also be embedded into a polymer, foil, or woven backing of cable accessory wrap assembly 124.

Figure 2B:
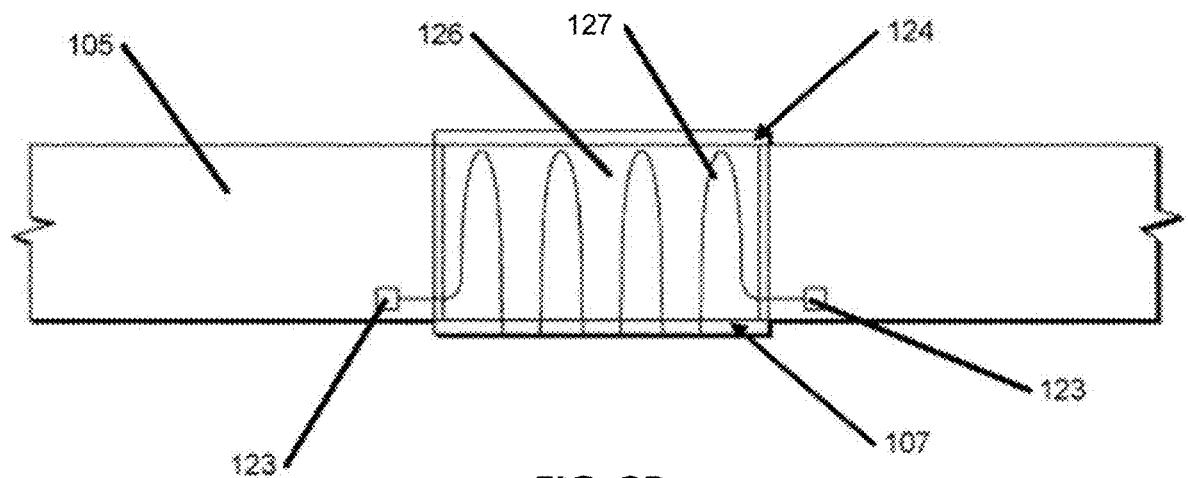
FIG. 2B depicts the cable accessory wrap assembly of FIG. 2A affixed around a cable splice, in accordance with one or more aspects described herein.

In various embodiments, wrap 126 may enable quick installation of a distributed sensing fiber over various portions of the cable system, such as splices, elbow or other joints, connectors, and/or other components or network elements included within the cable circuit—thereby allowing these cable accessories to be monitored via distributed sensing system 120. For example, FIG. 2B depicts cable accessory wrap assembly 124 affixed around a cable splice 110, in accordance with one or more aspects described herein. In some instances, cable accessory wrap assembly 124 may be applied to a cable accessory 110 (e.g., a splice) after cable accessory 110 is connected to cable 105. In other instances, cable accessory wrap assembly 124 may be applied to a cable accessory 110 prior to cable accessory 110 being connected to cable 105.

Figure 3A:
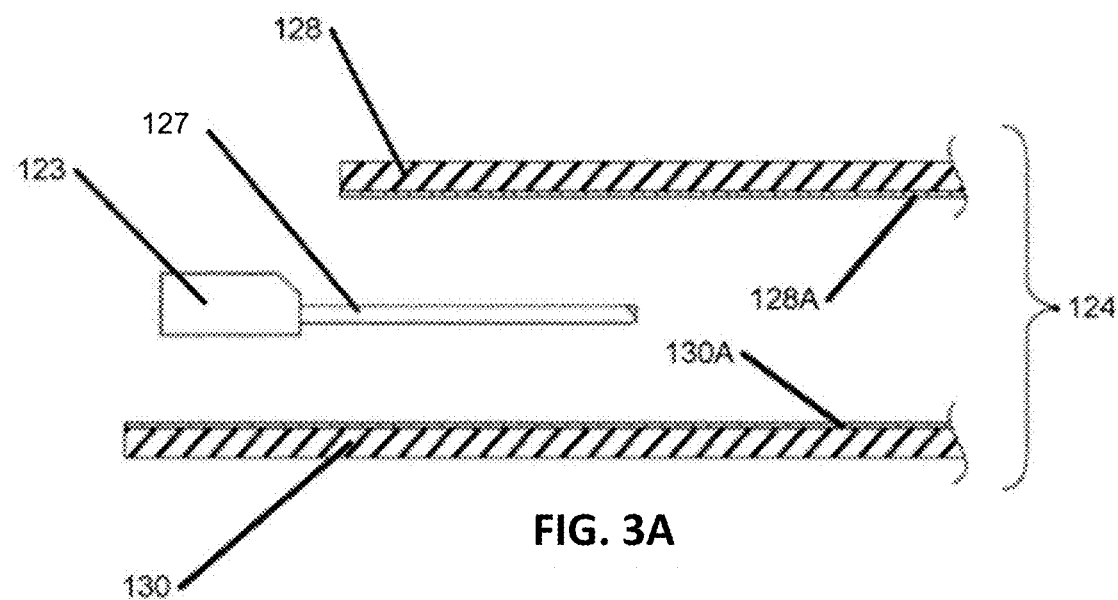
FIG. 3A depicts an exploded view of a cable accessory wrap assembly configured to be affixed to a cable with a cable accessory, in accordance with one or more aspects described herein.

FIG. 3A depicts an exploded view of cable accessory wrap assembly 124 configured to be affixed to a cable with a cable accessory (e.g., a cable splice), in accordance with one or more aspects described herein. In various embodiments, cable accessory wrap assembly 124 may be configured to be affixed to one or more types of cable accessories included within a cable circuit. For example, cable accessory wrap assembly 124 may be configured to be affixed to splices, elbow or other joints, connectors, and/or other components or network elements included within a cable circuit. As described herein, cable accessory wrap assembly 124 may include a wrap 126 and a fiber 127. As depicted in FIG. 3A, wrap 126 of cable accessory wrap assembly 124 may comprise a top layer 128 and a substrate layer 130. In some embodiments, cable accessory wrap assembly 124 may comprise additional or fewer layers. In various embodiments, top layer 128 may include a bottom-side adhesive 128A to bond with fiber 127. As described herein, in some embodiments, cable accessory wrap assembly 124 may include one or more connectors 123 to connect fiber 127 to fiber 122 of distributed sensing system 120. For example, connectors 123 may include a female fiber connector or a male fiber connector (not shown). In various embodiments, the length of fiber 127 included within cable accessory wrap assembly 124 may be determined based on the length of fiber 127 needed to ensure enough fiber covers cable accessory 110, as described herein. For example, fiber 127 may weave back and forth within wrap 126 (and/or with one or more other orientations) in order to ensure enough fiber covers cable accessory 110 such that distributed sensing system 120 can resolve one or more data points along the fiber that are within the bounds of the cable accessory. In an example embodiment, the length of fiber 127 may be long enough to ensure enough fiber covers cable accessory 110 such that distributed sensing system 120 can resolve a temperature difference at cable accessory 110.

In various embodiments, substrate layer 130 may be rubberized. In some embodiments, substrate layer 130 may include an adhesive layer 130A on a top side of substrate layer 130 to bond substrate layer 130 with fiber 127. In various embodiments, substrate layer 130 may include a peelable film coated adhesive layer (not shown) on a bottom side of substrate layer 130 to adhere cable accessory wrap assembly 124 to the cable and/or cable accessory (e.g., a splice) to which it is applied. In other embodiments, heat shrink tubing, straps, zip-ties or other ties, hook-and-loop fasteners, and/or other methods may be used to secure wrap 126 to the cable and/or cable accessory. In some embodiments, a molded saddle may be used to even out the splice body such that wrap 126 is presented with a smooth surface. For example, wrap 126 may be affixed by snapping molded saddle over the splice body. In this example, an outer surface of the molded saddle may have an adhesive coating to promote wrap adhesion.

Figure 3B:
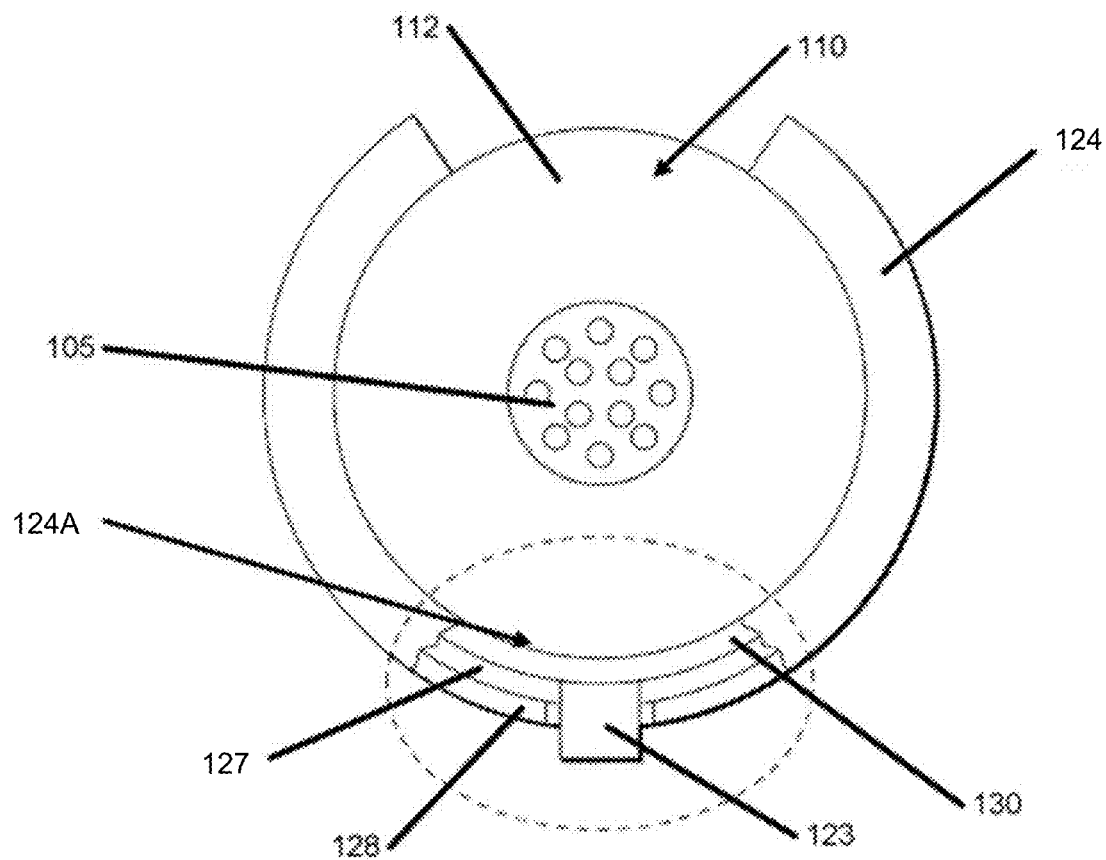
FIG. 3B depicts a cross-section view of the cable accessory wrap assembly of FIG. 3A, in accordance with one or more aspects described herein.

FIG. 3B depicts a cross-section view of cable accessory wrap assembly 124 wrapped around cable accessory 110, in accordance with one or more aspects described herein. As depicted in FIG. 3B, cable accessory 110 may comprise a splice with a splice body 112, and cable accessory wrap assembly 124 comprising fiber 127, top layer 128, and substrate layer 130 may be adhered to splice body 112 at interface 124A.

Figure 4A:
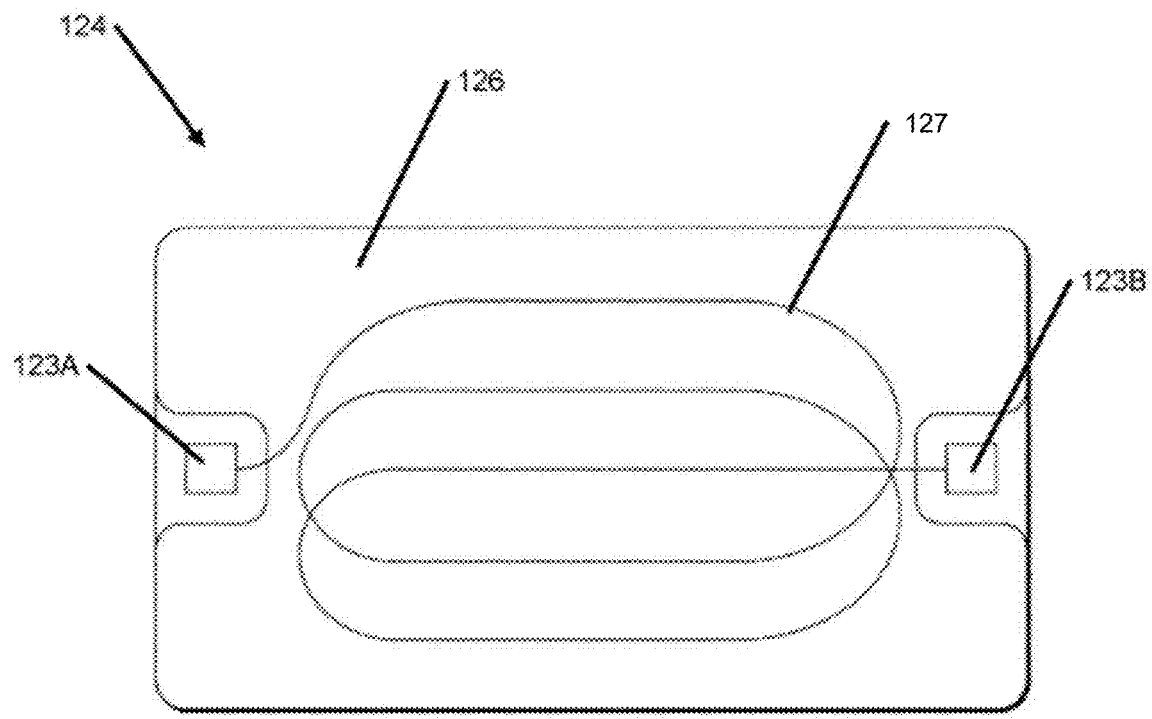
FIG. 4A depicts a top view of a cable accessory wrap assembly configured to be affixed to a cable with a cable splice, in accordance with one or more aspects described herein.

FIG. 4A depicts a top view of cable accessory wrap assembly 124 configured to be affixed to a cable with a cable accessory (e.g., a cable splice), in accordance with one or more aspects described herein. As depicted in FIG. 4A and described herein, cable accessory wrap assembly 124 may include wrap 126, fiber 127, and one or more connectors 123. For example, cable accessory wrap assembly 124 may include a first fiber connector 123A and a second fiber connector 123B. In some embodiments, top layer 128 may be notched for one or both of the first fiber connector 123A and the second fiber connector 123B. In various embodiments, the length of fiber 127 may be increased or decreased within cable accessory wrap assembly 124 by modifying the position and/or orientation in which fiber 127 is embedded within wrap 126. For example, cable accessory wrap assembly 124 may include a fiber 127 coiled from the first fiber connector 123A to the second fiber connector 123B as depicted in FIG. 4A to increase the length of fiber 127 within cable accessory wrap assembly 124. In some embodiments, fiber 127 coiled within cable accessory wrap assembly 124 may be at least 0.5 meters in length. In some embodiments, fiber 127 coiled within cable accessory wrap assembly 124 may be at least 1 meter in length. Other lengths may be utilized without departing from the scope of the present invention. In various embodiments, the total length of cable accessory wrap assembly 124 between first fiber connector 123A and second fiber connector 123B may be approximately the length of the splice, and the width of cable accessory wrap assembly 124 may be approximately the splice circumference.

Figure 4B:
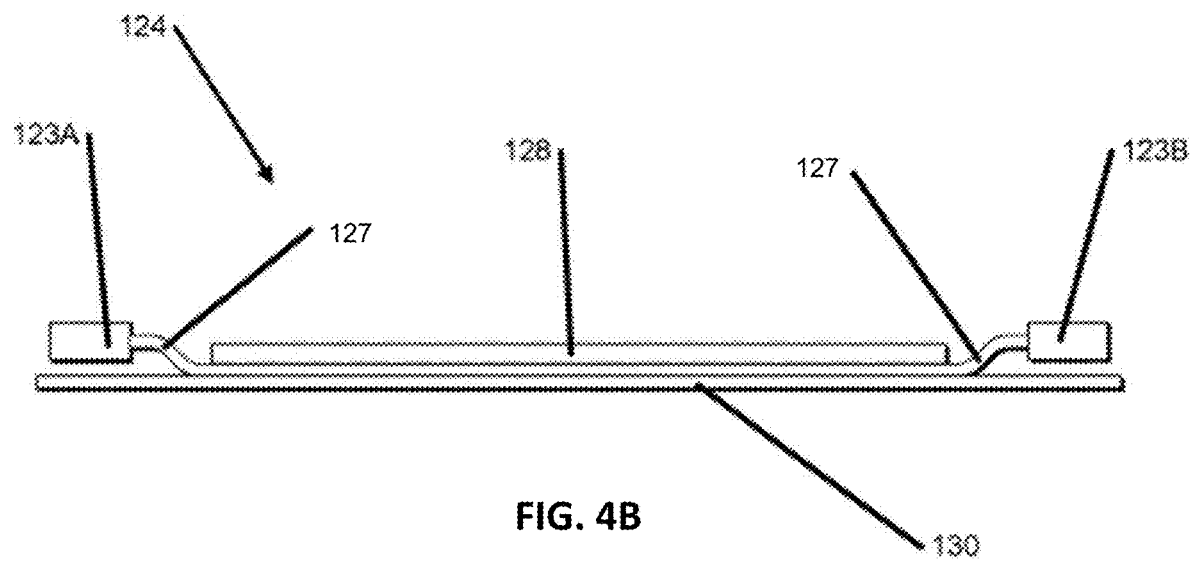
FIG. 4B depicts a side view of the cable accessory wrap assembly of FIG. 4A, in accordance with one or more aspects described herein.

FIG. 4B depicts a side view of cable accessory wrap assembly 124, in accordance with one or more aspects described herein. As depicted in FIG. 4B, fiber 127 may be sandwiched between top layer 128 and substrate layer 130. In various embodiments, fiber 127 may include fiber connectors 123 at each end of fiber 127 to connect to fiber 122 of distributed sensing system 120.

Figure 5A:
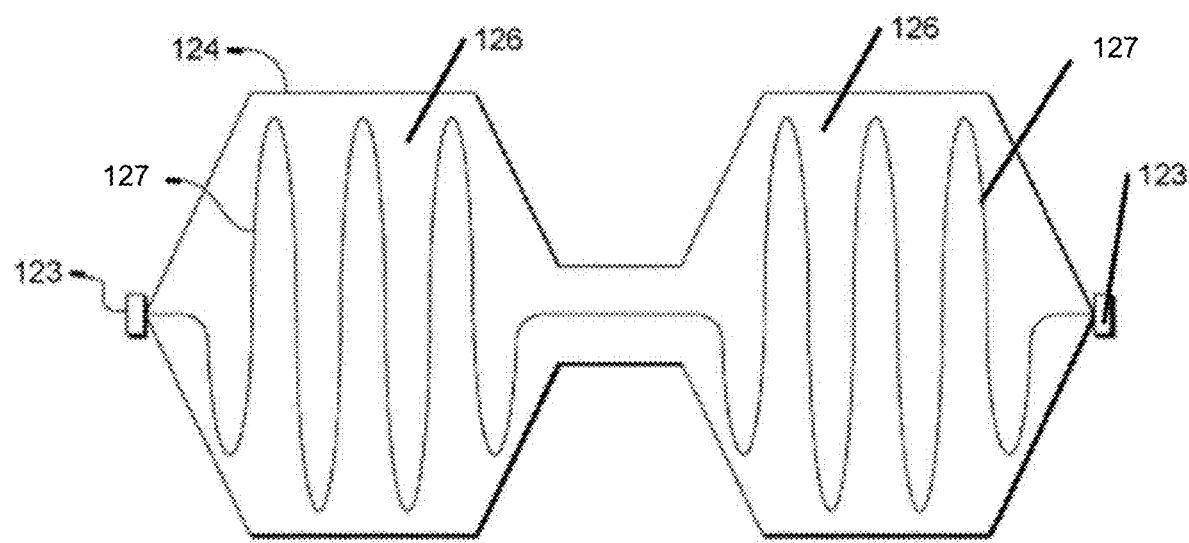
FIG. 5A depicts a top view of a cable accessory wrap assembly configured to be affixed to a cable with an elbow, in accordance with one or more aspects described herein.
Figure 5B:
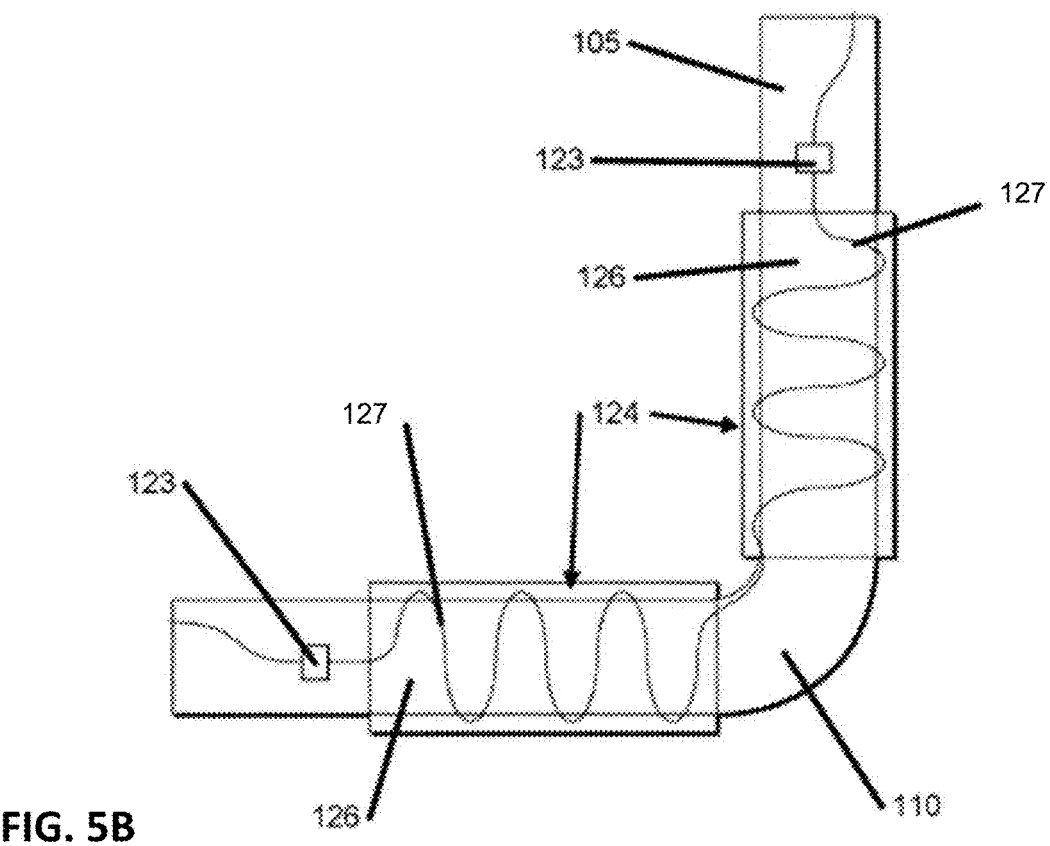
FIG. 5B depicts the cable accessory wrap assembly of FIG. 5A affixed at an elbow, in accordance with one or more aspects described herein.

FIG. 5A and FIG. 5B depict a cable accessory wrap assembly 124 configured to be affixed to a cable 105 with an elbow 110, in accordance with one or more aspects described herein. In various embodiments, the shape of cable accessory wrap assembly 124 may be specifically configured to enable quick and level installation of wrap 126 around a given type of cable accessory 110. For example, FIG. 5A depicts a top view of a cable accessory wrap assembly 124 with a shape specifically configured to be affixed to a cable 105 with an elbow 110, and FIG. 5B depicts cable accessory wrap assembly 124 affixed around an elbow 110, in accordance with one or more aspects described herein. In an example embodiment, cable accessory wrap assembly 124 may comprise two portions separated by a smaller portion configured to affix to two portions adjacent to the corner of an elbow joint and around the corner of the elbow joint itself, respectively (e.g., as depicted in FIG. 5A). As described herein, cable accessory wrap assembly 124 may include a fiber 127 embedded within wrap 126 and extend between one or more connectors 123.

Figure 6A:
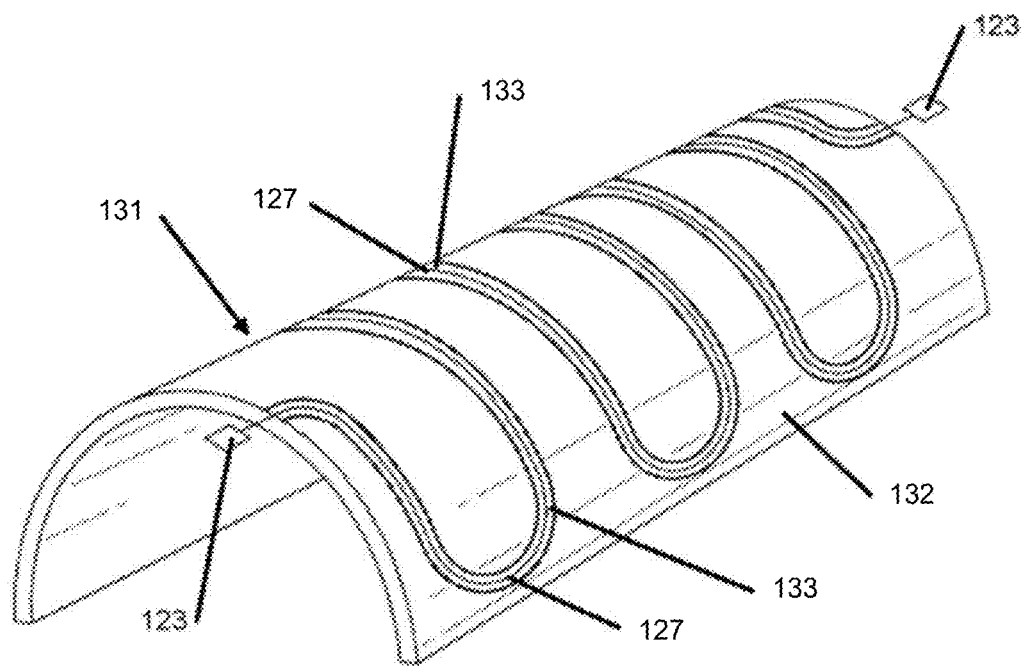
FIG. 6A depicts a perspective view of a shell or splice covering comprising a shell body and a runway/fiber trench for a distributed sensing fiber, in accordance with one or more aspects described herein.
Figure 6B:
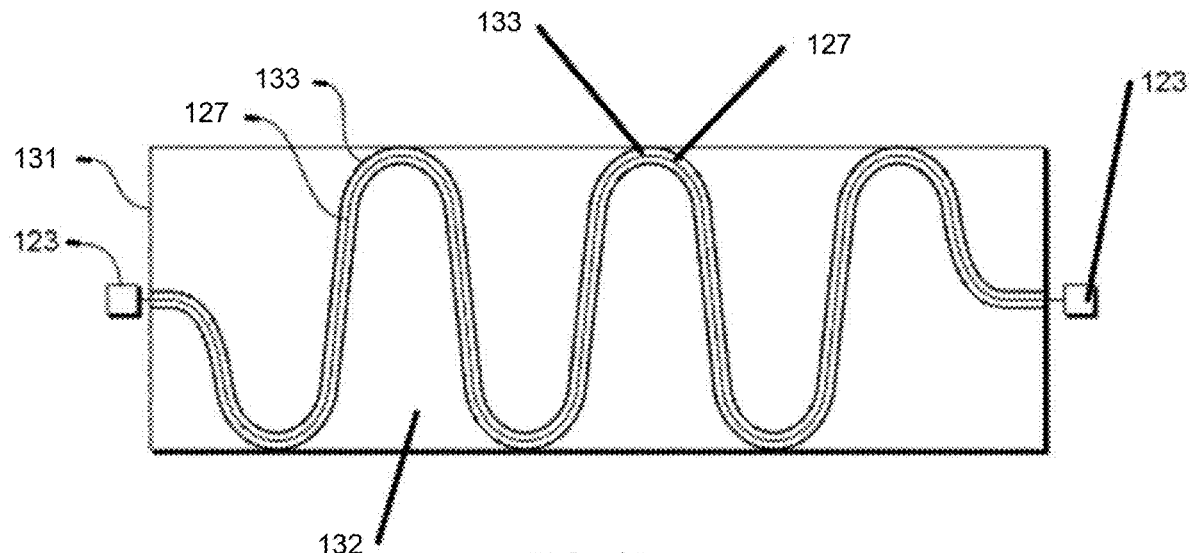
FIG. 6B depicts a top view of the shell or splice covering of FIG. 6A, in accordance with one or more aspects described herein.

In various embodiments, monitoring system 100 may include one or more shell or splice coverings. For example, FIG. 6A depicts a perspective view of a shell covering 131 comprising a shell body 132 and a runway/fiber trench 133 for a distributed sensing fiber, and FIG. 6B depicts a top view of shell covering 131 of FIG. 6A, in accordance with one or more aspects described herein. In various embodiments, a shell or splice covering (e.g., shell covering 131) as depicted in FIG. 6A and FIG. 6B may represent an alternative design in which shell covering 131 is used as an alternative to, or in addition to, cable accessory wrap assembly 124. In various embodiments, shell covering 131 may comprise a shell body 132 consisting of a material with high thermal conductivity (e.g., an aluminum shell) and a runway/fiber trench 133 for a distributed sensing fiber 127. In various embodiments, runway/fiber trench 133 may be designed such that the runway/fiber trench 133 provides protection for fiber 127. In various embodiments, shell covering 131 comprising a runway/fiber trench (e.g., runway/fiber trench 133) may wrap or fit around all or less of a cable and/or cable accessory (e.g., a splice). In some embodiments, the runway/fiber trench 133 may be routed back and forth along the major axis of the splice covering, or may otherwise allow for a coiled fiber 127 in order to increase the length of fiber 127 incorporated into the covering to ensure the distributed sensing system 120 can detect an event or anomaly (temperature, acoustic, or strain) at the cable accessory 110 being covered. To protect the fibers 127, the splice covering may have its own covering. For example, the splice covering may have its own covering made out of a high thermal conductive material.

In various embodiments, monitoring system 100 may be configured to monitor cable accessories in-line with cable 105 using fibers incorporated directly into the cable accessories. For example, in some embodiments, fibers the same as or similar to fiber 122 and fiber 127 may be incorporated directly into cable accessories, such as a splice, elbow or other joint, connector, and/or other component or network element included within a cable circuit.

In some embodiments, cable accessory wrap assembly 124 may include communications fibers to enable the extension of a fiber optic communications network past a cable accessory. For example, in some embodiments, cable accessory wrap assembly 124 may include fiber 127 and communication fiber(s) to enable the extension of the distributed sensing network and the fiber communications network simultaneously.

In some embodiments, cable accessory wrap assembly 124 may be preassembled to optimize coverage of one or more given types of cable accessories, such as a splice or a connector. In other embodiments, cable accessory wrap assembly 124 may be configured to be assembled in the field to meet identified specifications.

In various embodiments, cable accessory wrap assembly 124 may be manufactured using materials or techniques that minimize the thermal impact on the performance of the cable accessory 110. In some embodiments, cable accessory wrap assembly 124 and associated coverings may be robust enough mechanically to withstand direct burial with cable 105. While in example embodiments cable accessory wrap assembly 124 is envisioned to wrap around the full circumference of cable 105, fiber 127 within cable accessory wrap assembly 124 may not necessarily need to wrap around the full circumference of cable 105 or cable accessory 110. For example, fiber 127 within cable accessory wrap assembly 124 may not wrap around a top half or lower half of cable 105 and/or cable accessory 110. In some embodiments, a protective layer may be included over wrap 126. In some embodiments, wrap 126 and any protective layers may be covered using typical cable finishing techniques, including but not limited to shrink wrap rubber materials.

As described herein, monitoring system 100 may include a distributed sensing system 120. In various embodiments, distributed sensing system 120 may utilize distributed sensing to sense one or more external parameters over the entire length of fiber 122, including fibers covering cable accessories (e.g., fibers 127 of cable accessory wrap assemblies 124 connected to or integrated with fiber 122). In various embodiments, distributed sensing system 120 may be configured to monitor all in-line continuously connected cables and cable accessories, such as splices, elbow or other joints, connectors, and/or other components or network elements included within a cable circuit.

The present disclosure is disclosed above and in the accompanying drawings with reference to a variety of examples. The purpose served by the disclosure, however, is to provide examples of the various features and concepts related to the disclosure, not to limit the scope of the invention. It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, one skilled in the relevant art will recognize that numerous variations and modifications may be made to the examples described above without departing from the scope of the present disclosure. Thus, the spirit and scope of the invention should be construed broadly as set forth in the appended claims.

What is claimed is:

1. A wrap assembly configured to affix to a cable accessory in-line with a cable within a cable circuit, the wrap assembly comprising:
    a wrap comprising a top layer and a substrate layer, wherein the wrap assembly is configured to affix to a cable accessory in-line with a cable; and
    a distributed sensing fiber embedded within the wrap between the top layer and the substrate layer,
    wherein the distributed sensing fiber is connected at a first end of the wrap assembly to a distributed sensing system of the cable via a fiber running the length of the cable,
    wherein the distributed sensing fiber is configured to provide measurements to the distributed sensing system indicating that an anomaly event occurred at the cable accessory.

2. The wrap assembly of claim 1, wherein the cable accessory comprises a splice, elbow joint, or connector.

3. The wrap assembly of claim 1, wherein the distributed sensing fiber comprises a distributed temperature sensing fiber, a distributed strain sensing fiber, and/or a distributed acoustic sensing fiber.

4. The wrap assembly of claim 3, wherein the measurements provided to the distributed sensing system by the distributed sensing fiber enable the distributed sensing system to determine that a temperature, strain, or acoustic event anomaly occurred at the cable accessory.

5. The wrap assembly of claim 1, wherein the distributed sensing fiber extends from the first end of the wrap assembly to a second end of the wrap assembly opposite the first end.

6. The wrap assembly of claim 5, wherein the wrap assembly further comprises a first connector and a second connector, wherein the first connector is configured to connect the distributed sensing fiber to the fiber running the length of the cable at the first end of the wrap assembly, and the second connector is configured to connect the distributed sensing fiber to the fiber running the length of the cable at the second end of the wrap assembly.

7. The wrap assembly of claim 1, wherein the distributed sensing fiber is weaved back and forth within the wrap to increase a length of the distributed sensing fiber within the wrap.

8. The wrap assembly of claim 7, wherein the length of the distributed sensing fiber is sufficient to enable the distributed sensing system to resolve the cable accessory as a data point when determining where the anomaly event within a cable circuit comprising the cable occurred.

9. The wrap assembly of claim 1, wherein a bottom side of the top layer includes adhesive to bond the top layer to the distributed sensing fiber.

10. The wrap assembly of claim 1, wherein a top side of the substrate layer includes adhesive to bond the substrate layer to the distributed sensing fiber.

11. The wrap assembly of claim 1, wherein the distributed sensing fiber embedded within the wrap is at least 0.5 meters in length.

12. The wrap assembly of claim 1, wherein the wrap assembly further comprises one or more communication fibers to extend a fiber optic communication network of a cable circuit comprising the cable past the cable accessory.

13. The wrap assembly of claim 1, wherein a bottom side of the wrap includes adhesive to adhere the wrap assembly to the cable accessory.

14. A system for monitoring both cables and cable accessories included within a cable circuit using distributed sensing, the system comprising:
   a distributed sensing system configured to receive measurements from one or more distributed sensing fibers and identify where within a cable circuit an anomaly event occurred based on the received measurements, wherein the cable circuit comprises a cable and at least one cable accessory in-line with the cable;
   a first distributed sensing fiber connected directly to the distributed sensing system and running the length of the cable; and
   a second distributed sensing fiber associated with the at least one cable accessory and connected to the distributed sensing system via the first distributed sensing fiber, wherein the second distributed sensing fiber is configured to provide measurements to the distributed sensing system indicating that an anomaly event occurred at the cable accessory.

15. The system of claim 14, wherein the at least one cable accessory comprises a splice, elbow joint, or connector.

16. The system of claim 14, wherein the measurements provided to the distributed sensing system by the second distributed sensing fiber enable the distributed sensing system to determine that a temperature, strain, or acoustic event anomaly occurred at the cable accessory.

17. The system of claim 14, the system further comprising:
   a wrap assembly comprising the second distributed sensing fiber and configured to affix to the at least one cable accessory.

18. The system of claim 17, wherein the wrap assembly comprises:
   a wrap comprising a top layer and a substrate layer, wherein the second distributed sensing fiber is embedded within the wrap between the top layer and the substrate layer.

19. The system of claim 18, wherein a bottom side of the wrap includes adhesive to adhere the wrap assembly to the cable accessory.

20. The system of claim 14, wherein the at least one cable accessory comprises a splice, and wherein the system further comprises:
   a shell covering comprising a shell body and a runway trench comprising the second distributed sensing fiber, wherein the runway trench is configured to receive and protect the second distributed sensing fiber.

* * * * *